United States Patent [19]

Sterzer et al.

[11] 4,003,049
[45] Jan. 11, 1977

[54] DUAL MODE AUTOMOBILE COLLISION AVOIDANCE RADAR

[75] Inventors: Fred Sterzer, Princeton; Gerald Stanley Kaplan, Lawrenceville, both of N.J.

[73] Assignee: RCA Corporation, New York, N.Y.

[22] Filed: July 3, 1975

[21] Appl. No.: 593,016

[52] U.S. Cl. .................... 343/6 R; 343/6.5 R; 343/7 VM
[51] Int. Cl.² ................. G01S 9/56; G01S 9/46
[58] Field of Search .......... 343/7 VM, 18 D, 6 R, 343/6.5 R, 14

[56] References Cited

UNITED STATES PATENTS

| | | | |
|---|---|---|---|
| 3,311,912 | 3/1967 | Page | 343/6 R |
| 3,680,085 | 7/1972 | Signore | 343/14 |
| 3,760,414 | 9/1973 | Nicolson | 343/6.5 R |

*Primary Examiner*—Maynard R. Wilbur
*Assistant Examiner*—Richard E. Berger
*Attorney, Agent, or Firm*—E. J. Norton; J. D. Lazar; M. A. Lechter

[57] ABSTRACT

A frequency-modulated continuous-wave collision avoidance radar responsive to both reply signals from cooperating (tagged) targets and to skin reflections from proximate non-cooperating (non-tagged) targets.

6 Claims, 2 Drawing Figures

DUAL MODE AUTOMOBILE COLLISION AVOIDANCE RADAR

CROSS REFERENCES TO RELATED APPLICATIONS

Of interest are the following co-pending applications, all assigned to the assignee of the present invention: application Ser. No. 576,604, entitled "A Homodyne Communication System" filed May 12, 1975 by G. S. Kaplan and A. D. Ritzie now U.S. Pat. No. 3,984,835; application Ser. No. 473,765, entitled "An Electronic License Plate for Motor Vehicles" filed May 28, 1974 by F. Sterzer; application Ser. No. 593,120, entitled "Clutter Free Communications Radar" filed on or about even date herewith by G. S. Kaplan.

BACKGROUND OF THE INVENTION

1. Field of the Invention

The present invention relates to collision avoidance radar, and more particularly to a radar for use in automotive radar.

2. Description of the Prior Art

Conventional non-cooperative radar detecting and ranging systems, wherein a probe signal is transmitted toward a target and is "skin reflected" therefrom back to the interrogating unit, have typically been impractical for utilization as automotive collision avoidance systems because of what is known in the art as "clutter." "Clutter returns" from extraneous targets such as fixed objects along a roadway or moving vehicles in noncritical special relationship to the interrogating vehicle ("don't-care" targets) are not distinguishable from reflections from targets in critical relationship to the interrogating vehicle. The clutter returns thus cause a "false alarm" problem whereby automatic braking or passenger restraints such as air bags may be inopportunely deployed.

Cooperative systems wherein the radar is responsive only to specifically tagged targets which are capable of generating a reply signal, that in some way is distinguishable or discriminated from the radar interrogation and from skin reflections, are not subject to clutter. Such a cooperative detecting and ranging system, is disclosed in U.S. Pat. No. Re. 28,302 to Staras et al., dated Jan. 14, 1975. Such systems, however, do not respond to untagged targets or to targets having inoperative tags. Hence, the efficacy of such cooperative systems, as automotive detecting and ranging systems, is dependent upon acceptance and use of the system by the driving public at large and upon proper maintenance of the tags.

A vehicular collision avoidance system wherein forward viewing vehicle-mounted radio distance sensors are responsive to skin reflections from proximate targets and are adapted to cooperate with similar vehicle-mounted rearward viewing sensors that provide, in response to signals from the forward viewing sensor, actively augmented reflected signals to the forward viewing sensor, to thus allow detection of cooperating vehicles at greater distances while still using low power transmissions, is described in U.S. Pat. No. 3,760,414, issued Sept. 18, 1973 to A. M. Nicolson. The Nicolson system, thus, requires two transceivers, one in the forward facing sensor, and one in the rearward facing sensor. The sensors transmit regular trains of extremely short duration, relatively low amplitude baseband pulses. Such a system is disadvantageous in that there is no discrimination between active and passive targets and thus, if the Nicolson system is not restricted to short range operation, clutter due to returns from non-critical or "don't-care" targets is not provided for, thus causing false alarms and inopportune deployment of passenger restraints.

The present invention overcomes disadvantages and problems present in the prior art by providing a detecting and ranging system which responds both to tagged targets and to skin reflections for proximate untagged targets, and which is relatively immune to clutter.

SUMMARY OF THE INVENTION

The present invention provides an improved interrogating station for a system for detecting the presence and range of a remote object from the interrogating station. The interrogating station is arranged to transmit modulated probe signals in a given direction. The object may be any member of the class comprising cooperative targets having means for receiving probe signals and radiating return signals having a characteristic indicia and non-cooperating targets serving to reflect the probe signals as return signals. The interrogating station comprises: means for generating the modulated probe signals including means for generating a sample signal indicative of the probe signal; means receptive of the return signals and the probe sample signal for generating a difference signal having distinguishable components indicative of return signals from the cooperative objects and of return signals from the non-cooperative objects; and means, responsive to the difference signals, for generating a signal indicative of the range between the interrogating station and the cooperative objects, and the range between the interrogating station and the non-cooperative objects for all ranges not exceeding a predetermined value.

DESCRIPTION OF THE PREFERRED EMBODIMENT

Figure 1:
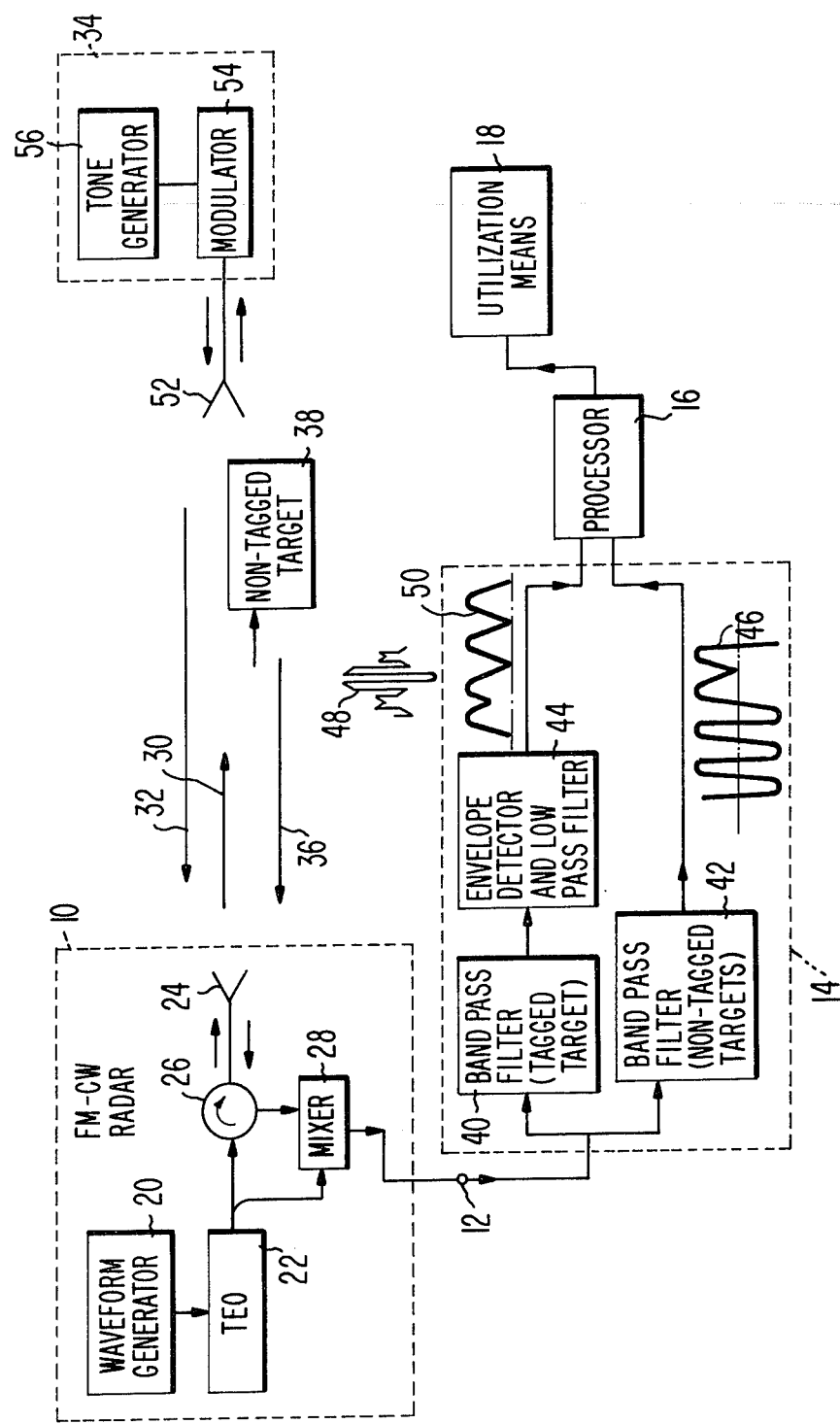
FIG. 1 is a block diagram of a dual mode radar in accordance with the present invention.

Referring to FIG. 1, there is shown a frequency-modulated continuous-wave (FM CW) radar 10, having an output terminal 12, which is connected to what may be termed a target discriminator 14. Target discriminator 14 is, in turn, coupled to a suitable processor 16 which provides information and control signals to suitable utilization means 18.

FM CW radar 10 typically comprises conventional components such as a waveform generator 20, a transferred electron oscillator (TEO) 22, an antenna network 24, a circulator 26 and a mixer 28. As illustrated in FIG. 1, waveform generator 20 is connected to TEO 22, the output signal of which is applied to antenna network 24, via circulator 26. In addition a small portion of the TEO 22 output signal is applied to mixer 28, via a directional coupler (not shown). The antenna network 24 is arranged to transmit the TEO output signal as a radar interrogation or probe signal 30 and to receive reply signals 32 from a tagged target, generally indicated as 34 and skin reflections 36 from an untagged target generally indicated as 38. Reply signal 32 and skin reflection 36 will be described and generally referred to as the "return signals." It should be noted that while untagged target 38 is shown as a separate entity, the reflective surfaces of tagged target 34 may in themselves, operate as an untagged target. Thus, a tagged target 34 with an inoperative or faulty tag would appear to the system as an untagged target.

Reply 32 and skin reflections 36, as received by antenna 24, are routed to mixer 28 via circulator 26. The output signal of mixer 28, amplified and filtered if desired, is utilized as the output signal of FM CW radar 10, and is applied, as noted above, to target discriminator 14.

Figure 2:
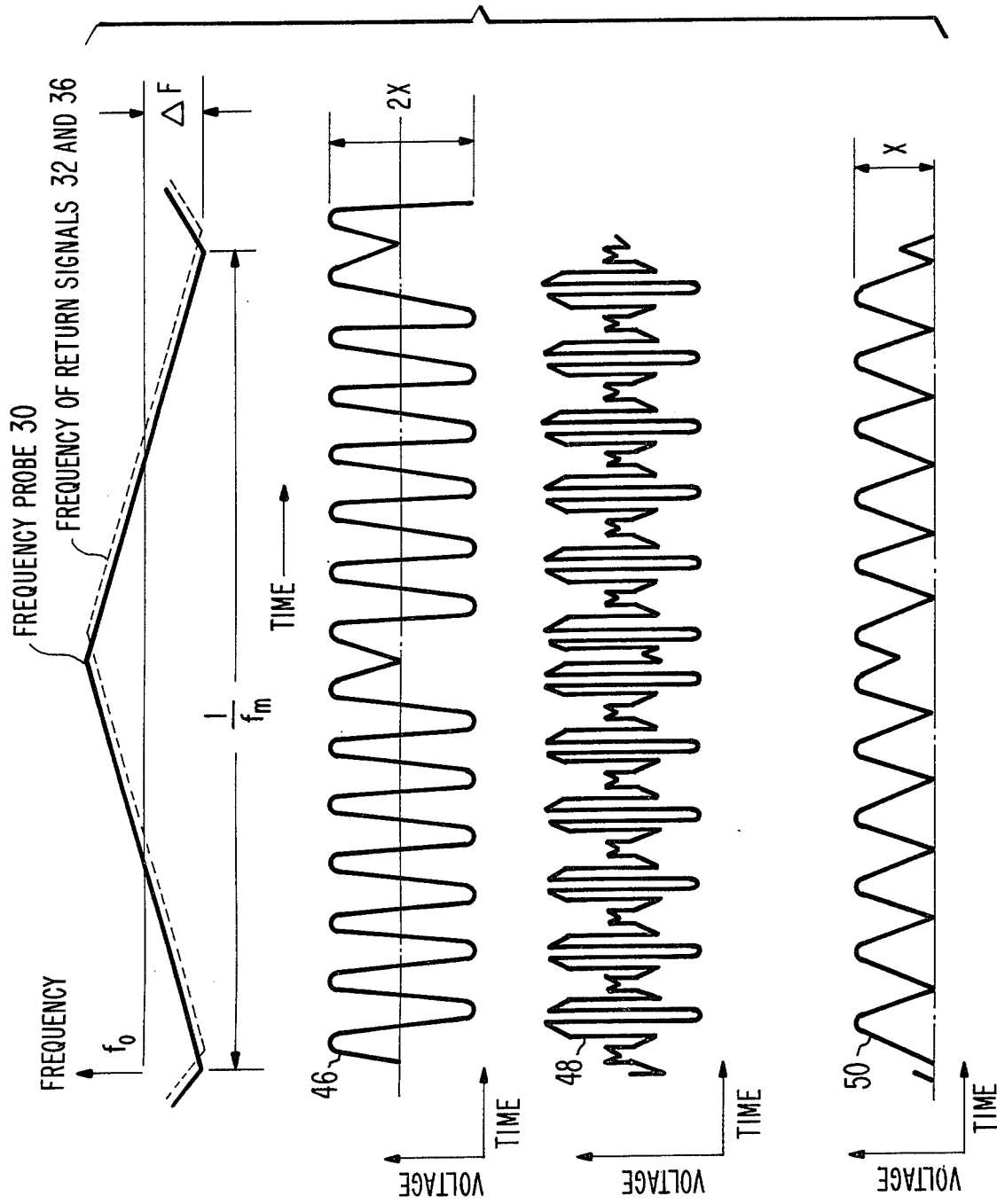
FIG. 2 is a diagram of waveforms related to the embodiments of the present invention.

Target discriminator 14 comprises a plurality of bandpass filters (BPF) 40 and 42, and an envelope detector and low pass filter 44. The output signal of radar 10 is applied to the bandpass filters 40 and 42. The bandpass filters 40 and 42 are respectively tuned to the band of frequencies corresponding to tagged targets and non-tagged targets within predetermined distances from the radar unit as will be explained. Thus, BPF 40 passes what may be termed the reply component 48 (see FIG. 2) of the output signal of radar 10 and BPF 42 passes what may be termed the skin-reflection component 46 of the output signal of radar 10. Reply component 48 is applied to envelope detector and low pass filter 44. The output signal 50 of envelope detector and low pass filter 44 and the skin-reflection component 46 are applied to processor 16. The waveforms of the respective signals 46, 48, and 50 are shown in FIG. 2 for the case where the probe 30 is frequency modulated with a triangular waveform and skin-reflections 36 are from the reflective surfaces of the cooperative target 34.

Processor 16 suitably comprises means for detecting the respective frequencies of skin reflection component 46 and signal 50. Suitable processors for the respective components are described in the aforementioned patent to Staras et al., and in U.S. Pat. No. 3,968,492 entitled "Adaptive Parameter Processor for Continuous Wave Radar Ranging System" issued July 6, 1976, to G. S. Kaplan. Alternatively, processor 16 may comprise a counter (not shown) receptive of signal 50 for determining the frequency of signal 50 and appropriate threshold circuitry (not shown) receptive of signal 46, for detecting the presence of an untagged target 38 within a predetermined range. Logic circuitry (not shown) receptive of the output signals of the counter and threshold circuitry, would provide the information and control signals required by utilization means 18.

Utilization means 18 typically includes a display, an alarm, braking and throttle controls, and/or a passenger restraint, such as an air bag. A description of suitable utilization means in cooperation with a compatible processor may be found in an article by J. Shefer and R. J. Klensch, entitled "Harmonic Radar Helps Autos Avoid Collision," IEEE Spectrum, Vol. 10, page 38, May 1973.

The tags for cooperating targets 34 comprise, in the preferred embodiment, an antenna 52, a voltage controlled phase modulator, such as a varactor diode 54, and a tone generator 56. Tone generator 56 suitably generates a square wave having a frequency much greater than the beat or difference frequency derived by radar 10 as will be explained, from skin reflections from an untagged target at a predetermined maximum range, for example 100 meters. The amplitude of the tone is such as to cause modulator 54 to shift the phase of reply signal 32, alternately, for example, by zero and 180° at a periodic rate equal to the tone frequency. A more detailed description of a suitable tag utilizing such phase modulation techniques may be found in application Ser. No. 576,604 entitled "A Homodyne Communication System" filed May 12, 1975 by G. S. Kaplan and A. D. Ritzie. The tag described in this referenced application includes features, such as a frequency shift keying communication scheme, not required for practicing the present invention. Further, reference to a description of a system comprising a communication channel and a ranging channel is made to copending application Ser. No. 593,120 entitled "Clutter Free Communication Radar" filed on or about the same day of filing the present application by G. S. Kaplan.

With reference to FIGS. 1 and 2 the operation of the system is now addressed. Radar 10 transmits, as probe signal 30, a continuous wave signal which is frequency modulated in accordance with a predetermined periodic modulation waveform. Waveform generator 20 is chosen to generate a predetermined periodic waveform. TEO 22 generates a signal having a frequency in accordance with the waveform applied by waveform generator 20 and, as noted above, the output signal of TEO 22 is transmitted by antenna 24. Antenna 24 is preferably a printed circuit corporate feed antenna of the type described in U.S. Pat. No. 3,587,110. For use in an automotive vehicle, the radiation pattern from antenna 24 is in the direction of forward travel of the interrogating vehicle and is preferably confined to a single lane of highway, to reduce "blinding" of the radar by interrogation signals from other radar units in the vicinity of the interrogating unit.

Probe signal 30 impinges upon tagged target 34 and nontagged target 38, which respectively causes reply signal 32 and skin reflection 36, to be radiated back to radar 10. Skin reflection 36 and reply signal 32 are received by radar 10 and are mixed with a sample of the interrogation signal 30 in mixer 28. The output of mixer 28 is appropriately filtered and amplified to obtain a difference signal having skin reflection and reply components 46 and 48, being indicative of frequency and phase differences between the sample of the TEO 22 output signal and skin-reflection 36 and reply signal 32, respectively.

The range of the respective targets may be determined from components 46 and 48. The finite distance or range between the interrogating unit and a target introduces a round trip delay time $\rho$ between the return signal from the target and the instantaneous interrogation signal sample, determined by the relationship:

$$\tau = \frac{2R}{C} \tag{1}$$

where R is the range and C is the velocity of light. Hence, since the interrogation signal 30 is frequency modulated with a predetermined periodic modulation waveform, the return signals are shifted in frequency from the instantaneous interrogation signal by an amount proportional to the range of the respective targets. For example, where waveform generator 20 provides a triangular waveform having a peak value of $\Delta F$ and a period of $1/f_m$, as shown in FIG. 2, to frequency modulate the interrogation signal 30, the frequency shift $f_b$, manifested by the output signal of mixer 28, as will be explained, is equal to the time derivative of the frequency of the interrogation signal times the round trip delay; that is:

$$f_b = \frac{df}{dt} \cdot \tau = \frac{8R(\Delta F \cdot f_m)}{C} \quad (2)$$

Thus, the range between the respective targets and radar 10 may be computed by a measurement of the frequency shift $f_b$ of the return signals due to the round trip delay, hereinafter termed the "beat frequency." Skin reflections 36 are thus shifted in frequency with respect to the instantaneous interrogation signal by an amount proportional to the range of untagged target 38. Skin reflection component 46 of the radar 10 output signal (output of mixer 28) thus, ignoring the periodic phase inversions, maintains a frequency equal to the beat frequency between the TEO 22 output sample and the skin reflections 36. The range of untagged targets 38 accordingly may be determined by measuring the frequency of skin reflection component 46.

Reply signals 32, however, are not only shifted in frequency with respect to a sample of the interrogating probe 30 due to the round trip delay time, but are also alternately phase shifted by zero and 180° at a given periodic rate, due to the phase modulation effected in the tag 34 by phase modulator 54 and tone generator 56. Accordingly, when reply signal 32 is mixed with the sample of interrogating probe 30 in mixer 28, the amplitude of the reply component 48 output signal of mixer 28 will respond to both the phase modulation and to the frequency shift due to the round trip delay and will, in effect, produce a signal, having a frequency equal to the tone frequency, modulated with a signal having a frequency equal to the frequency shift due to the round trip delay.

Target discriminator 14 serves to eliminate the problem of clutter by passing to processor 16 only signals representative of tagged targets 34, and non-tagged targets 38 within a predetermined short range, for example, 3 meters, from radar 10. Bandpass filter 40 is center tuned to the tone frequency of tone generator 56. Since the tone frequency is chosen, as noted above, to be much greater than the skin reflection beat frequency corresponding to the chosen maximum range of the system, only signals corresponding to replies from tagged targets are passed by bandpass filter 40. Envelope detector and low pass filter 44 serves to remove the tone frequency signal, and derive envelope signal 50, the frequency of which is representative of the round trip delay. Envelope detector and low pass filter 44 also serves to cut off any signals from targets beyond the chosen maximum range of the system. Bandpass filter 42 is tuned to pass that band of frequencies representative of skin reflection from targets within the predetermined short range, e.g., 3 meters, of the radar. Thus, only signals representative of tagged targets 34 and non-tagged targets 38 within a predetermined short range of radar 10 are acted upon by processor 16.

Processor 16 then determines the range and/or presence of threatening targets and a decision is made to deploy or activate various utilization means 18. Reference is again made to the aforementioned article by J. Shefer and R. J. Klensch "Harmonic Radar Helps Autos Avoid Collision" for a detailed description of the operation of suitable processors 16 and utilization means 18.

It should be appreciated that discriminants other than phase modulation of the reply signals 32 may be employed in the present invention. For example, modulator 54 could be an amplitude modulator, whereupon reply component 48 of the output signal of mixer 28 could again be described as a signal having the frequency of the tone generator 56, amplitude modulated with a signal having a frequency equal to the frequency shift due to round trip delay. Component 48 would be processed through bandpass filter 40 and envelope detector and low pass filter 44 to generate an envelope signal 50 which would be equivalent to the beat frequency signal derived from a non-tagged target at the location of tagged target 34.

It should be apparent from the foregoing description that the present invention provides a particularly advantageous automotive collision avoidance radar which substantially eliminates the problem of clutter returns by responding to only, of those targets detected beyond a predetermined short distance from the radar tagged targets, yet avoids the problems inherent in a cooperative system such as when, for instance, a tag fails, by responding to skin reflections from untagged targets within the predetermined short range.

It will be understood that the above description is of illustrative embodiments of the present invention and that the invention is not limited to a specific form shown. Modifications may be made of the design and arrangement of the elements without departing from the spirit of the invention.

What is claimed is:

1. In a system for detecting the presence and range of a remote object from a probe station, said probe station transmitting modulating probe signals in a given direction, said object being of the class comprising cooperative targets having means for receiving probe signals and radiating return signals having a characteristic indicia and non-cooperating targets serving to reflect said probe signals as return signals, said probe station comprising:
   means for generating said modulated probe signals including means for generating a sample signal indicative of said probe signal;
   means, receptive of said return signals and said sample signal, for generating a difference signal having distinguishable components indicative of return signals from said cooperative objects and of return signals from said non-cooperative objects; and
   means, responsive to said difference signals, for generating a signal indicative of the range between said probe station and said cooperative objects, and the range between said probe station and said non-cooperative objects for all ranges not exceeding a predetermined value.

2. In a system according to claim 1 wherein said probe signal generating means generates an FM CW signal, and wherein said range indicative means includes band pass filter means for passing signals having frequency components corresponding respectively to said cooperative and non-cooperative objects.

3. A system for detecting and ranging cooperating and non-cooperating targets, comprising:
   first means for transmitting a modulated RF signal as a probe signal, in a given direction;
   second means for receiving reply signals from said cooperating targets derived by said cooperating targets from said probe signal and skin reflections from non-cooperating targets, said reply signals being distinguishable from said skin reflections;

third means, receptive of said reply signals, said skin reflections and sample signal indicative of said probe signal, for deriving a difference signal having components indicative respectively of differences between said sample signal and reply signals and of differences between said sample signal skin reflections; and fourth means, receptive of said difference signal, for generating output signals indicative of targets within one of a first category of targets and a second category of targets, said first category of targets consisting of said cooperating targets, said second category of targets consisting of non-cooperating targets within a predetermined distance of said system.

4. The system of claim 3, wherein:

said first means frequency modulates said RF signal in accordance with a predetermined periodic waveform, whereby said components of said difference signal manifest frequency shifts between said probe sample signal and said respective reply signals and skin reflections, said frequency shift being indicative of the distance to the respective targets; and said fourth means comprises a first bandpass filter receptive of said difference signal, responsive only to components of said difference signal corresponding to targets within said first category of targets;

said fourth means further comprising a second bandpass filter, receptive of said difference signal, responsive only to components of said difference signal manifesting frequency shifts corresponding to targets within said second category of targets.

5. The system of claim 4 wherein:

said reply signals are modulated with a tone of a predetermined frequency, said predetermined frequency being greater than the frequency shift from said probe signal sample of a skin reflection from a non-cooperating target at a chosen maximum range;

said components of said difference signal indicative of said cooperating targets, being signals having a frequency equal to said predetermined frequency, modulated with a signal having a frequency equal to the frequency shift from said probe signal sample of skin reflections from non-cooperating targets at the respective ranges of said cooperating targets; said first bandpass filter being center-tuned to said predetermined frequency.

6. The system of claim 4 wherein said RF signal is frequency modulated in accordance with a periodic triangular waveform.

* * * * *

UNITED STATES PATENT OFFICE
CERTIFICATE OF CORRECTION

PATENT NO. : 4,003,049
DATED : January 11, 1977
INVENTOR(S) : FRED STERZER ET AL It is certified that error appears in the above-identified patent and that said Letters Patent are hereby corrected as shown below:

Column 1, line 32, "special" should read -- spacial --.

Column 4, line 49, "$\rho$" should read --$\tau$--

Column 6, line 34, "modulating" should read --modulated--

Signed and Sealed this

Tenth Day of May 1977

[SEAL]

Attest:

RUTH C. MASON
*Attesting Officer*

C. MARSHALL DANN
*Commissioner of Patents and Trademarks*